United States Patent
Agahi

(10) Patent No.: US 8,813,254 B2
(45) Date of Patent: Aug. 19, 2014

(54) CONDITIONAL ACCESS SYSTEM SWITCHER

(75) Inventor: Saied Agahi, San Diego, CA (US)

(73) Assignee: Motorola Mobility LLC, Chicago, IL (US)

( * ) Notice: Subject to any disclaimer, the term of this patent is extended or adjusted under 35 U.S.C. 154(b) by 889 days.

(21) Appl. No.: 12/468,843

(22) Filed: May 19, 2009

(65) Prior Publication Data

US 2009/0288151 A1 Nov. 19, 2009

Related U.S. Application Data

(60) Provisional application No. 61/054,354, filed on May 19, 2008.

(51) Int. Cl.
*H04L 29/06* (2006.01)

(52) U.S. Cl.
USPC ........ 726/30; 726/1; 726/26; 726/27; 726/28; 726/29; 380/200; 380/201; 380/203; 380/255; 380/270; 705/50; 705/51; 705/56; 705/57; 705/59; 709/217; 709/219; 709/225; 709/226; 709/229

(58) Field of Classification Search
USPC .......... 726/1, 26–33; 380/200–204, 231–234, 380/255–270; 709/217–219, 223–229; 705/50–59
See application file for complete search history.

(56) References Cited

U.S. PATENT DOCUMENTS

| | | | | |
|---|---|---|---|---|
| 6,637,027 | B1 * | 10/2003 | Breslauer et al. | 725/25 |
| 7,680,275 | B1 * | 3/2010 | Balestri et al. | 380/201 |
| 2003/0097454 | A1 * | 5/2003 | Yamakawa et al. | 709/229 |
| 2003/0182579 | A1 * | 9/2003 | Leporini et al. | 713/201 |
| 2005/0100162 | A1 * | 5/2005 | Alve et al. | 380/210 |
| 2008/0022411 | A1 * | 1/2008 | Wendling et al. | 726/27 |

OTHER PUBLICATIONS

Conditional Access in Mobile Systems: Securing the Application by Gallery et al; Publisher: IEEE; Year: 2005.*

* cited by examiner

*Primary Examiner* — Madhuri Herzog
(74) *Attorney, Agent, or Firm* — Fox Rothschild LLP

(57) ABSTRACT

A system is configured to provide access between a plurality of terminals and a plurality of different conditional access systems (CASs) associated with the terminals. The system includes a CAS switcher configured to receive requests from the plurality of terminals and, for each of the requests, identifies and sends the requests to a corresponding CAS. The CAS switcher also receives messages from the CASs responsive to the requests and, for each of the messages, identifies and sends the message to a corresponding terminal.

20 Claims, 4 Drawing Sheets

CONDITIONAL ACCESS SYSTEM SWITCHER

PRIORITY

The present patent application claims priority to provisional patent application Ser. No. 61/054,354, filed May 19, 2009, and entitled "Conditional Access for Mobile TV" which is incorporated by reference in its entirety.

BACKGROUND

Information broadcast systems include subscription-based systems in which a user subscribes to a broadcast system that provides programming or other content to the subscriber through a network. Since the programming is broadcasted, it is transmitted once for receipt by all eligible receivers. Access to the content, however, is conditional, depending, for example, on whether or not a subscription fee has been paid for a specific receiver. Such conditional access to the content is realized by encrypting the information (usually the encryption occurs in the transmitter) under control of an authorization key and by transmitting the encrypted content to the receivers. Furthermore, the decryption keys necessary for the decryption of the content are encrypted themselves and transmitted to the receivers. Often, symmetrical encryption techniques are used, where the encryption and decryption keys are the same. Only those receivers that are entitled to the content are able to decrypt the decryption key using a first decryptor. The receivers can then decrypt the content using a second decryptor for decrypting the content under control of the authorization key.

The conditional access described above is provided by Conditional Access Systems (CASs) that encrypt the content, and provide the keys to Conditional Access (CA) modules in the subscribed terminals to decrypt the content. In a mobile television deployment scenario there will be a number of channels, all or some of which will be part of services offered by mobile network operators (MNOs). A service may include content transmitted to terminals, such as mobile TV services. Each type of mobile device may need to communicate with a different CAS to request content and to receive keys for decrypting the content. This dramatically increases the system complexity for the MNOs and the amount of work need to port and update conditional access modules for the mobile devices as needed.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures may not be described in detail so as not to unnecessarily obscure the description of the embodiments.

According to an embodiment, a CAS switcher is provided that operates as a central controller servicing requests from terminals. The CAS switcher manages communications between different terminals and their respective CASs. The CAS switcher provides a common entry point for all terminals, minimizes the amount of work needed to port a CA module into the terminals, increases the overall security for each CAS by limiting access to an external network, and adds interactivity for CAS systems which do not support requests from a terminal.

Figure 1:
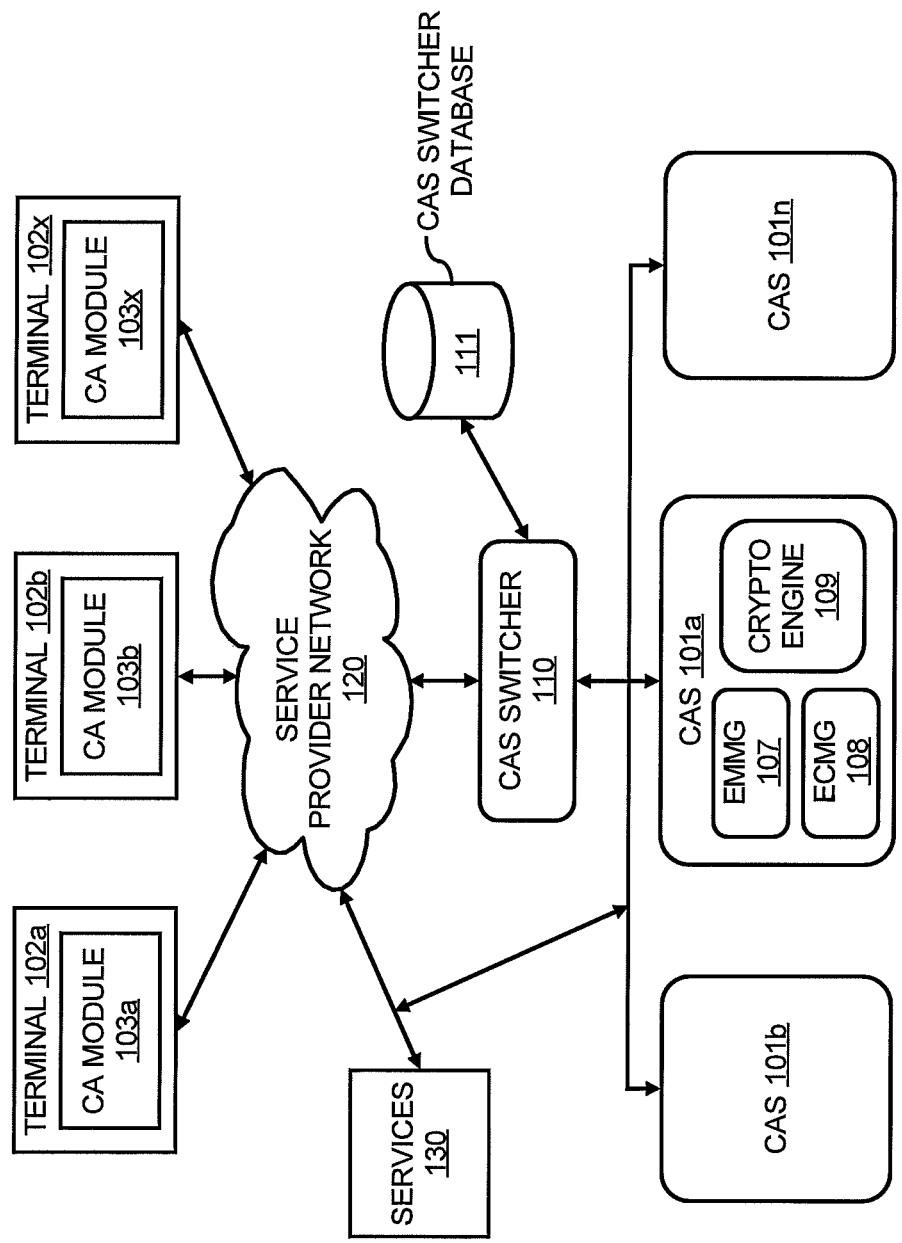
FIG. 1 illustrates a system including a CAS switcher, according to an embodiment.

FIG. 1 illustrates a system 100, according to an embodiment. The system 100 includes a CAS switcher 110, a CAS switcher database 111, CASs 101a-n, terminals 102a-x, a service provider network 120, and services 130. The CASs 101a-n include CASs from different suppliers. For example, CAS 101a may be provided by MOTOROLA, and CAS 101b-n may be provided by other suppliers. Each CAS may use their own type encrypted conditional access messages having content that varies by supplier. The messages may include Entitlement Management Messages (EMMs) and Entitlement Control Messages (ECMs). EMMs convey information related to the status of a subscription to a service. Once a user's access privileges are verified using the EMM, the receiver in the terminal is authorized to decrypt ECMs and, in turn, control words, which are short-term (known as the crypto-period, e.g., 10 seconds for mobile TV services) decryption keys that enable decryption of content for the service. In one example, the service is a digital mobile TV service provided via a cellular network, and the content is the programming, such as programs, movies, etc. If a user has a subscription to the service, the terminal for the user receives the EMM for the service verifying the user has access to the service, then the ECMs are used to decrypt and play the content. The EMM may include an encrypted message that contains private conditional access information about the authority a viewer has to acquire reception for such services.

Examples of modules in a CAs are shown for CAS 101a. These modules may include an EMMG 107, which is an EMM generator for generating EMMs for terminals. An ECMG 108 is an ECM generator for generating ECMs for terminals. A crypto engine 109 encrypts EMMs and ECMs. Other modules may be included in the CASs.

The services 130 include the broadcasters that provide the encrypted content in data streams. Examples of broadcasters for digital TV services include CNN, pay-per-view broadcasters, NBC, HBO, etc. The services 130 may include other services that deliver digital content, for example, audio or video, other than digital TV.

The CASs 101a-n include ECMs in the data streams from the services 130. One or more of the terminals 102a-x may use different CASs, so a service may use multiple CASs to allow for conditional access to the content by as many terminals as possible. The data streams may be broadcasted on broadcast channels in the service provider network 120 to the terminals 102a-x. The broadcast channels may be one-way communication channels. The service provider network 120 may also include interactivity channels, which are two-way channels.

The terminals 102a-x include devices. The devices may be portable devices, such as cellular phones or other devices that are capable of sending and receiving digital data over the service provider network 120. The service provider network 120 may include a cellular network, such as 3G network, and/or other types of networks. The terminals 102a-x may be other types of devices, such as set-top boxes, that communicate via a cable service provider network.

The terminals 102a-x include CA modules 103a-x, respectively. Both EMMs and ECMs are decrypted by the CA modules 103a-x. Once the CA module verifies a user's access privileges using the EMM, the content is decrypted using the control words retrieved or derived from the ECMs. Each CA module derives control words from the ECMs for decrypting the content in the broadcasted data streams that the user is authorized to access. The CA modules 103a-x may be hardware, software or both.

The CAS switcher 110 manages EMM requests from the terminals 102a-x and manages EMM distribution from the CASs 101a-n. In one example, an EMM request is a request for an EMM update. For example, a terminal of the terminals 102a-x may realize that it has missed an EMM update. An EMM update may include updated software for the CA module. A missed EMM update may be caused by the terminal being off or being out of the coverage area of the service provider network 120 for an extended period of time. The terminal requests the update by sending an EMM request to the CAS switcher 110. The terminal sends the EMM request message, as defined by its CAS provider, to request the missed EMM. Note that the EMM request message differs from one CAS to another as it is usually proprietary to the CAS supplier.

In another example, an EMM request is a request for an EMM to access a service. For example, a user wants to view a pay-per-view event, and the user sends an EMM request for the event to the CAS via the CAS switcher 110. The CAS verifies the user has paid for the event and sends the EMM via the CAS switcher 110 to the terminal of the user. The terminal may then decrypt ECMs and content for the event.

The CAS switcher 110 determines which CAS should be receiving the request based on information in the request and information stored in the CAS switch database 111 for each CAS, and forwards the request to the appropriate CAS. Also, the CAS switcher 110 receives the updated EMM from the CAS and identifies the terminal to send the updated EMM. The CAS switcher 110 forwards the updated EMM to the terminal requesting the EMM.

Figure 2:
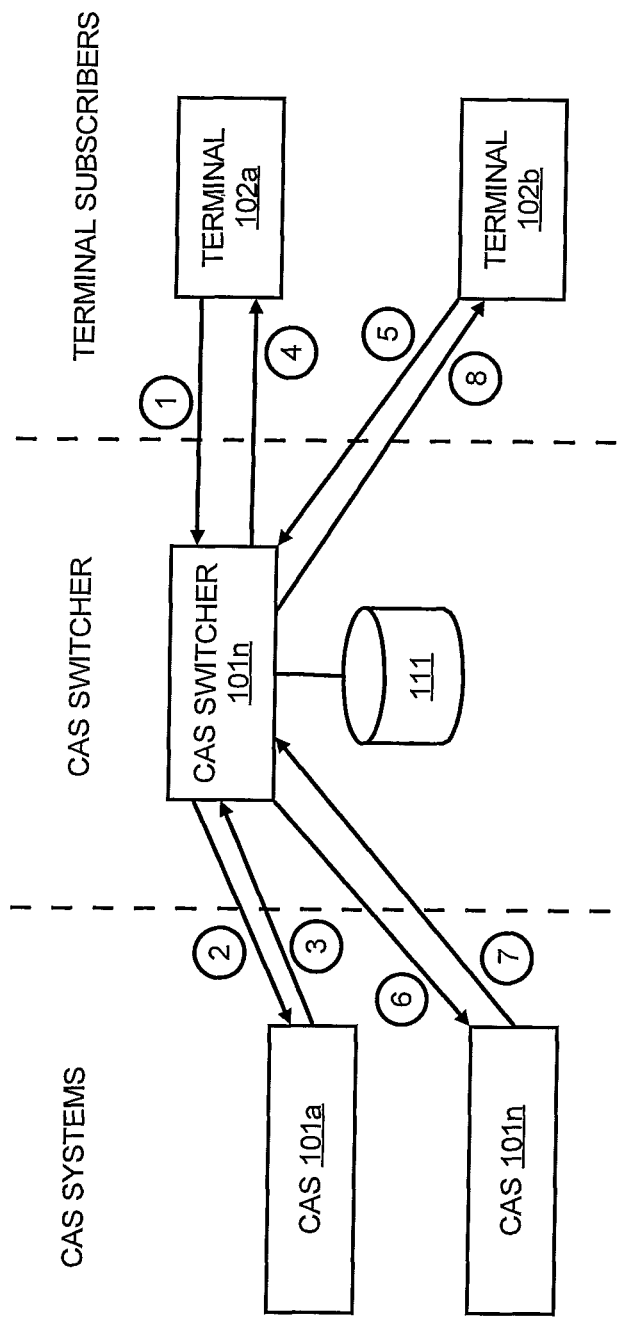
FIG. 2 illustrates data flow in the system, according to an embodiment.

FIG. 2 illustrates some operations of the CAS switcher 110, according to an embodiment. Assume the terminals 102a and 102b are mobile terminals operable to receive conditional access digital TV content from the services 130. Each of the terminals 102a and 102b are configured to a specific CAS. Any service requests from the terminals 102a and 102b contain the details required to identify the CAS along with the service related information that is being requested. The information identifying each CAS is also stored in the CAS switcher database 111.

In one embodiment, the information identifying each CAS include a CAS ID that is unique to each different CAS supplied by a different supplier and an operator ID that uniquely identifies the MNO. Allocation of the values for the operator ID may be under the control of the CAS, identified by the CAS ID and allows differentiation between operators using the same CAS.

The information identifying each CAS (e.g., the CAS ID and the operator ID) may be sent to the terminals 102a and 102b within an Electronic Service Guide (ESG). The ESG may be broadcasted to terminals and indicates the services that are available; how they can be received. The ESG may be provided in an IP data stream which is delivered on a well known IP address and port number to the terminals 102a and 102b. The CA modules 103a and 103b retrieve and store the CAS ID for their CASs and the operator ID for the service provider of the network. This information is included in the EMM requests sent from the terminals 102a and 102b.

Shown as 1, the terminal 102a sends an EMM request message to the CAS switcher 110. The EMM request message may include a request to receive an EMM so the terminal can receive mobile TV channels from a broadcaster. In one example, a user clicks on an icon via an interface in the terminal 102a to request the EMM. The EMM request message includes a CAS ID for the CAS for the terminal 102a and an operator ID for an MNO providing the service provider network 120.

The CAS switcher 110 receives the EMM request message and parses the message to identify the CAS ID and the operator ID. The CAS switcher 110 performs a lookup in the CAS switcher database 111 to identify the CAS corresponding to the CAS ID and the operator ID from the EMM request message. In this case, the CAS identified from the lookup is CAS 101a.

Shown as 2, the CAS switcher 110 forwards the EMM request message to the CAS 101a. Shown as 3, the CAS 101a generates an EMM for the terminal 102a, and the CAS 101a sends the EMM to the CAS switcher 110. The CAS switcher 110 identifies the terminal of the subscriber to receive the EMM, for example, using information in the EMM and information stored in the CAS switcher database 111 that connects a subscriber ID with a terminal ID. Shown as 4, the CAS switcher 110 sends the EMM to the terminal 102a.

A similar set of steps 5-8 is shown for the terminal 102b. The terminal 102b sends an EMM request message to the CAS switcher 110, shown as 5. The CAS switcher 110 identifies the CAS 101n as the CAS for the terminal 102b. The CAS switcher 110 sends the EMM request message to the CAS 101n, shown as 6. The CAS 101n sends the EMM to the CAS switcher 110, shown as 7, and the CAS 110 forwards the EMM to the terminal 102b, shown as 8.

In one embodiment, the CAS switcher 110 is designed as a web service which provides direct access for the terminals 102a-x. The terminals 102a-x can use http/https protocols to send/receive all requests. In case the terminals 102a-x do not have a data service, requests may be sent out-of-band, such as via an interface to SMS-C which allows the terminals 102a-x to send/receive the request via SMS messages.

Figure 3:
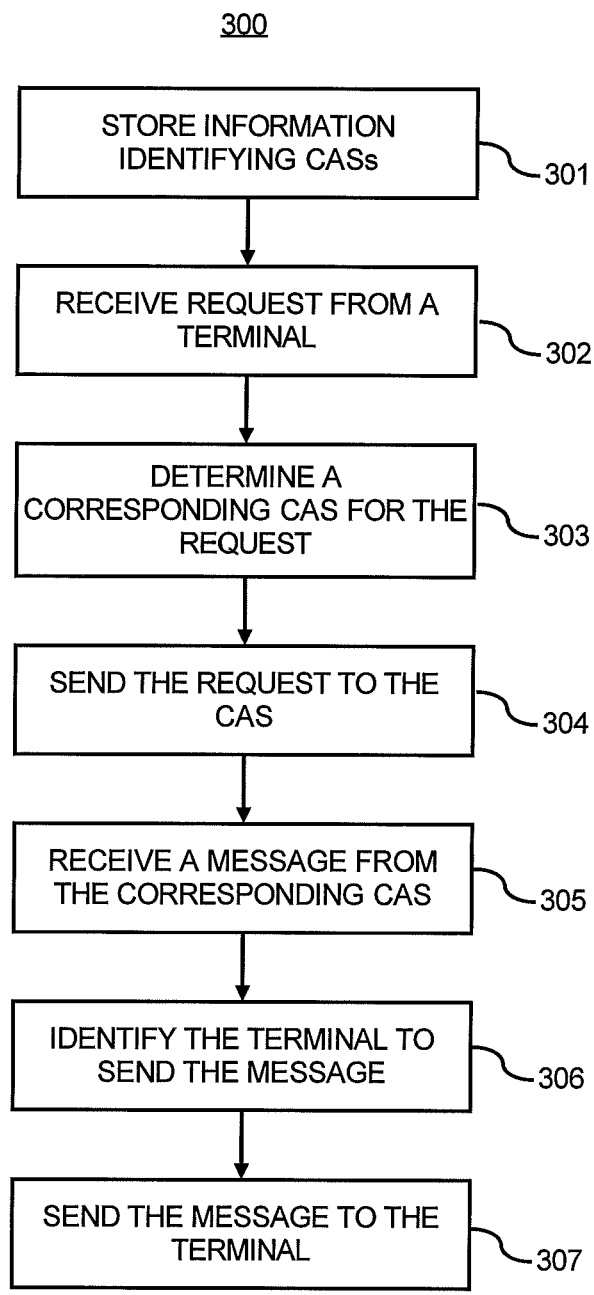
FIG. 3 illustrates a method for CAS switching, according to an embodiment.

FIG. 3 illustrates a flow chart of a method 300 for a CAS switcher providing access between terminals and CASs, according to an embodiment. The method 300 is described with respect to FIGS. 1 and 2 by way of example. Also, some of the steps may be rearranged or modified without departing from the scope of the embodiments.

At step 301, information identifying CASs for corresponding terminals is stored in a data storage device. For example, the database 111 stores CAS IDs and operator IDs.

At step 302, the CAS switcher 110 receives a request from a terminal. For example, an EMM request is received from the terminal 102a as shown in FIG. 2. The CA modules in the terminals may store information indicating all EMM requests are to be sent to the CAS switcher 110. This may include network address information for the CAS 110.

At step 303, the CAS switcher 110 determines a corresponding CAS for the request. Each terminal may use a different CAS. The EMM request includes information that can be used to identify the CAS for the terminal 102a, such as CAS ID and operator ID. The CAS switcher 110 performs a lookup in the database 111 using the CAS ID and operator ID from the EMM request to identify the corresponding CAS for the terminal 102a, which is the CAS 101a.

At step 304, the CAS switcher 110 sends the request to the CAS 101a.

At step 305, the CAS switcher 110 receives a message from the corresponding CAS in response to the request. For example, the CAS switcher 110 receives an EMM from the CAS 101a. In one example, the CAS switcher 110 identifies all EMMs sent to terminals in the service provider network 110 from information in the EMMs, and then uses information in the EMMs to identify the terminal to send the EMM.

At step 306, the CAS switcher 110 identifies the terminal to send the message. For example, the EMM may include a terminal ID of the terminal 102a.

At step 307, the CAS switcher 110 sends the message to the terminal. For example, the EMM is sent to the terminal 102a.

The steps in the method 300 are repeated for multiple requests from multiple terminals. Also, the CAS switcher 110 may not modify information in the EMM requests and the EMMs, because that information may be proprietary to the CAS system.

Figure 4:
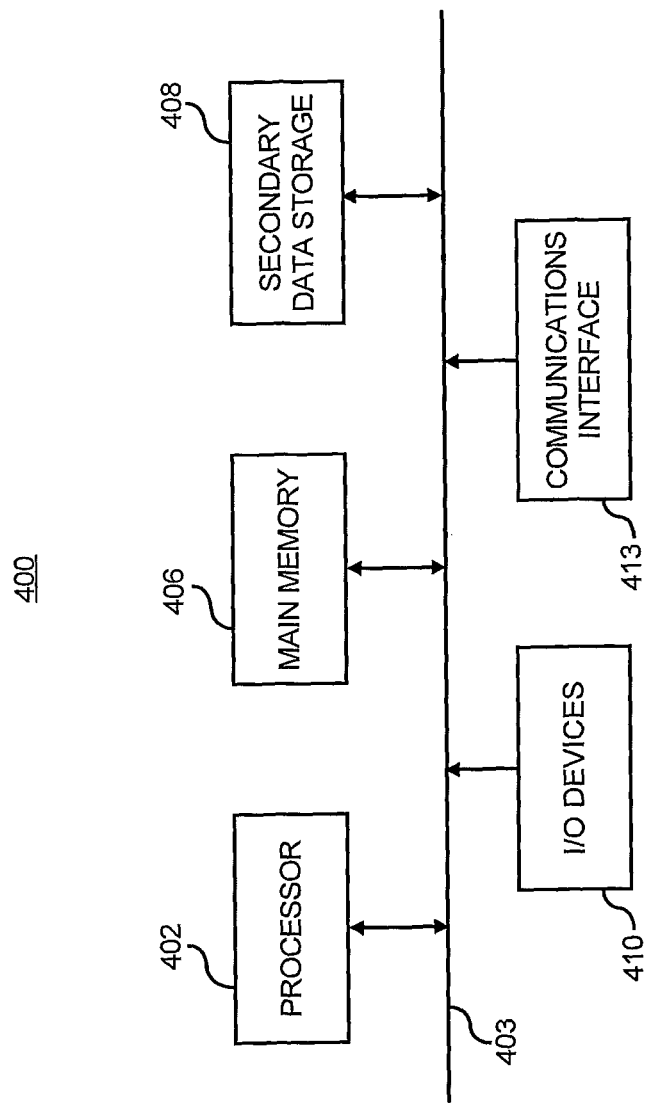
FIG. 4 illustrates a computer system that may be used as a platform, according to an embodiment.

FIG. 4 illustrates a block diagram of a computer system 400 that is operable to be used as a platform for the CAS switcher 110. The system 400 includes a processor 402, providing an execution platform for executing software. The processor may be processing circuitry, such as ASIC. Commands and data from the processor 402 are communicated over a communication bus 403. The system 400 also includes a main memory 406, such as a Random Access Memory (RAM), where software may reside during runtime, and a secondary memory 408. The secondary data storage 408 may include, for example, a nonvolatile memory where a copy of software is stored. In one example, the secondary data storage 408 also includes ROM (read only memory), EPROM (erasable, programmable ROM), EEPROM (electrically erasable, programmable ROM). In another example, the secondary data storage 408 may be a hard disk.

The system 400 includes I/O devices 410. The I/O devices may include a display and/or user interfaces comprising one or more I/O devices 410, such as a keyboard, a mouse, a stylus, speaker, and the like. A communication interface 413 is provided for communicating with other components. The communication interface 413 may be a wired or a wireless interface. The communication interface 413 may be a network interface.

The CAS switcher 110 may be provided in a device in the service provider network 120 or outside the service provider network 120. Also, the CAS switcher 110 may be software executed in the computer system 400 or a combination of hardware and software.

One or more of the steps in the method 300 and other steps described herein are operable to be implemented as software stored on a computer readable storage medium, such as the memory 406 and/or 408, and executed on the system 400, for example, by the processor 402.

The steps are operable to be embodied by a computer program can exist as software program(s) comprised of program instructions in source code, object code, executable code or other formats for performing some of the steps. The codes described above may be embodied on a computer readable storage medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A system comprising:
a conditional access system (CAS) switcher configured to receive a plurality of entitlement management message (EMM) requests from a plurality of mobile terminals operable to receive conditional access broadcast content from at least one subscription service, the received EMM requests requesting information related to broadcast content from the at least one subscription service and, for each of the EMM requests, the CAS switcher identifying a corresponding CAS associated with the mobile terminal that sent EMM request from a plurality of different types of CASs associated with the plurality of mobile terminals each of the plurality of CASs providing its own type of conditional access messages determined by a supplier of the CAS, and the CAS switcher sending the EMM requests to the identified corresponding CAS, and wherein the CAS switcher is further configured to receive conditional access messages from the plurality of different types of CASs responsive to the EMM requests and, for each of the conditional access messages, identifying a corresponding one of the plurality of mobile terminals associated with the EMM request on which the conditional access message is based and sending the conditional access messages to the identified corresponding one of the plurality if mobile terminals;
a data storage device storing information identifying the plurality of different types of CASs, and wherein the CAS switcher compares information in each of the EMM request to the information stored in the data storage device to identify the corresponding CAS from the plurality of different types of CASs corresponding to the EMM request.

2. The system of claim 1, wherein the EMM requests request information related to a status of a subscription for conditional access to services provided by the CASs, and wherein the plurality of mobile terminals are mobile devices.

3. The system of claim 2, wherein the EMM requests comprise requests for EMMs that are used by the plurality of mobile terminals to gain conditional access to the broadcast content from the at least one subscription service.

4. The system of claim 2, wherein the EMM requests comprise requests for EMM updates, wherein the EMM updates include new code for a conditional access module in the plurality of mobile terminals.

5. The system of claim 4, wherein the requests for EMM updates are requested by the plurality of mobile terminals in response to the plurality of mobile terminals being off or out of a network coverage area.

6. The system of claim 2, wherein the messages are EMMs sent in response to the EMM requests, and each of the EMMs is encrypted and contains private conditional access information about authority of a user to access a service.

7. The system of claim 2, wherein the at least one subscription service is a mobile television (TV) service delivered via a cellular network, and the EMM requests are used to determine whether a user has subscribed to receive the mobile TV service.

8. The system of claim 1, wherein the CAS switcher is configured to identify a CAS identification (ID) and an operator ID from each of the EMM requests, and a lookup in the data storage device is performed using the CAS ID and the operator ID to identify one of the plurality of different types of CASs associated with each of the EMM requests.

9. The system of claim 2, wherein the EMM requests are sent via an interactive channel in a network.

10. The system of claim 1, wherein the EMM requests are sent out-of-band from a service provider network.

11. The system of claim 1, wherein each of the plurality of different types of CASs are configured to encrypt content for a given subscription service, and provide keys to Conditional Access (CA) modules in the plurality of mobile terminals to decrypt the content if users of the plurality of mobile terminals are subscribed to the given subscription service.

12. The system of claim 1, wherein the CAS switcher is a web service and the EMM requests are sent to the CAS switcher as HTTP requests.

13. The system of claim 1, wherein the CAS switcher does not modify information in the EMM requests and the conditional access messages.

14. A system comprising:
a conditional access systems (CAS) switcher configured to receive entitlement management message (EMM) requests from a plurality of mobile terminals operable to receive conditional access broadcast content from at least one subscription service, the EMM requests requesting information related to broadcast content from the at least one subscription service and, for each of the EMM requests, the CAS switcher identifying a corresponding CAS associated with the mobile terminal that sent the EMM request from a plurality of different types of conditional access systems (CASs) associated with the plurality of mobile terminals, each of the plurality of CASs providing its own type of conditional access messages determined by a supplier of the CAS, the CAS switcher sending the EMM requests to the identified corresponding CAS, wherein the EMM requests request information related to a status of a subscription for conditional access to the at least one subscription service provided using at least one of the plurality of different types of CASs, and the CAS switcher is configured to receive EMMs from the plurality of different types of CASs in response to the EMM requests and, for each of the EMMs, the CAS switcher identifies a corresponding one of the plurality of mobile terminals associated with the EMM request on which the EMM is based and sends the EMM to the identified corresponding one of the plurality of mobile terminals, wherein the EMMs are encrypted and contain private conditional access information about authority of a user to access the at least one subscription service; and
a data storage device storing information identifying the plurality of different types of CASs, and wherein the CAS switcher compares information in each of the EMM requests to the information stored in the data storage device to identify the corresponding CAS from the plurality of different types of CASs corresponding to the EMM request.

15. The system of claim 14, wherein the CAS switcher is configured to identify a CAS identification (ID) and an operator ID from each of the requests, and a lookup in the data storage device is performed using the CAS ID and the operator ID to identify the corresponding one of the plurality of different types of CASs for each of the EMM requests.

16. The system of claim 14, wherein the at least one subscription service is a mobile television (TV) service delivered via a cellular network, and the plurality of mobile terminals are configured to receive the mobile TV service via the cellular network if the EMMs indicate users of the plurality of mobile terminals are subscribed to receive the mobile TV service.

17. The system of claim 14, wherein the EMM requests comprise requests for EMMs that are used by the plurality of mobile terminals to gain conditional access to services provided by the CASs.

18. The system of claim 14, wherein the EMM requests comprise requests for EMM updates, wherein the EMM updates include new code for a conditional access module in the plurality of mobile terminals.

19. A non-transitory computer readable medium upon which is embedded programmed instructions which when executed by a computer system will cause the computer system to perform a method comprising:
storing information identifying a plurality of different types of conditional access systems (CASs) associated with a plurality of mobile terminals in a data storage device, each of the plurality of CASs providing its own type of conditional access messages determined by a supplier of the CAS, and each of the plurality of mobile terminals being operable to receive conditional access broadcast content from at least one subscription service;
receiving entitlement management message (EMM) requests from the plurality of mobile terminals that request information related to broadcast content from the at least one subscription service and, for each of the EMM requests;
identifying a corresponding one of the plurality of CASs associated with the mobile terminal that sent the EMM request using the stored information and information in the EMM request, and sending the EMM request to the identified corresponding CAS;
receiving conditional access messages from the plurality of different types of CASs responsive to the EMM requests; and
for each of the received conditional access messages, identifying a corresponding one of the plurality of mobile terminals associated with the EMM request on which the conditional access message is based using information in the conditional access message, and sending the conditional access message to the identified corresponding one of the plurality of mobile terminals.

20. The computer-readable medium of claim 19, wherein the EMM requests request information related to a status of a subscription for conditional access to the at least one subscription service provided using at least one of the plurality of different types of CASs, and wherein the plurality of mobile terminals are mobile devices.

* * * * *